(12) United States Patent
Bayer et al.

(10) Patent No.: US 9,382,809 B2
(45) Date of Patent: Jul. 5, 2016

(54) SEAL ASSEMBLY, METHOD AND TURBOMACHINE

(71) Applicant: MTU AERO ENGINES GMBH, Munich (DE)

(72) Inventors: Erwin Bayer, Dachau (DE); Thomas Hess, Munich (DE); Manfred Feldmann, Eichenau (DE); Sven Hiller, Rohrmoos (DE); Peter Geiger, Munich (DE)

(73) Assignee: MTU AERO ENGINES GMBH, Munich (DE)

( * ) Notice: Subject to any disclaimer, the term of this patent is extended or adjusted under 35 U.S.C. 154(b) by 750 days.

(21) Appl. No.: 13/749,093

(22) Filed: Jan. 24, 2013

(65) Prior Publication Data

US 2013/0189086 A1 Jul. 25, 2013

(30) Foreign Application Priority Data

Jan. 25, 2012 (DE) .......................... 10 2012 201 050

(51) Int. Cl.
*F01D 11/00* (2006.01)
*F01D 25/00* (2006.01)
*F01D 11/12* (2006.01)
*F02C 7/28* (2006.01)
*F16J 15/44* (2006.01)

(52) U.S. Cl.
CPC .............. *F01D 25/00* (2013.01); *F01D 11/001* (2013.01); *F01D 11/127* (2013.01); *F02C 7/28* (2013.01); *F16J 15/444* (2013.01); *F05D 2240/55* (2013.01); *F05D 2250/283* (2013.01); *Y02T 50/671* (2013.01)

(58) Field of Classification Search
CPC ....... F01D 11/001; F01D 11/127; F02C 7/28; F05D 2240/55; F05D 2250/283; F16J 15/444
USPC ........................................................ 415/174.4
See application file for complete search history.

(56) References Cited

U.S. PATENT DOCUMENTS

| | | | | |
|---|---|---|---|---|
| 6,612,809 | B2 * | 9/2003 | Czachor | F01D 11/005 415/189 |
| 6,962,482 | B2 * | 11/2005 | Tanaka | F01D 5/225 277/414 |
| 7,797,948 | B2 * | 9/2010 | Weaver | F01D 9/023 277/399 |
| 2004/0169122 | A1 * | 9/2004 | Dodd | F01D 11/127 248/674 |
| 2009/0304497 | A1 * | 12/2009 | Meier | F01D 11/001 415/170.1 |
| 2010/0074732 | A1 * | 3/2010 | Marra | F01D 5/025 415/173.4 |

FOREIGN PATENT DOCUMENTS

DE 10259963 A1 7/2004

* cited by examiner

*Primary Examiner* — Craig Kim
*Assistant Examiner* — Michael Sehn
(74) *Attorney, Agent, or Firm* — Howison & Arnott

(57) ABSTRACT

A sealing arrangement for a turbomachine for sealing a radial gap between a rotor and a stator, with a plurality of sealing segments each comprising a honeycomb element and a base body for holding the honeycomb element, and with at least one support for arranging the sealing segments on a rotor section or stator section, wherein the base bodies can be arranged on the at least one support by a radial movement and by a plastic deformation of at least one body section, a generative method for the integral production of the sealing segments, and a turbomachine are disclosed.

12 Claims, 1 Drawing Sheet

SEAL ASSEMBLY, METHOD AND TURBOMACHINE

CROSS-REFERENCE TO RELATED APPLICATIONS

This application claims benefit of German Patent Application No. 102012201050.5, filed Jan. 25, 2012, entitled Dichtungsanordnung, Verfahren sowie Strömungsmaschine, the specification of which is incorporated herein in its entirety.

TECHNICAL FIELD

The invention relates to a seal assembly or sealing arrangement for use in turbomachines, to a method for producing a sealing segment, as well as to a turbomachine.

BACKGROUND

Sealing arrangements, also known as seal assemblies, are used on a regular basis in turbomachines, such as airplane engines, for sealing a radial gap between rotating engine components and stationary engine components. They permit a damage-free running-in of blade tips, sealing webs and the like, and they result in a reduction of leakage streams.

Known sealing arrangements comprise a plurality of sealing segments each consisting of a honeycomb element and a base body for accommodating or holding the honeycomb element. The base body can be an integral body section of an engine component, such as an outer shrouding band of a rotor blade, or an individual component which is mounted on a rotor- or stator-side supporting section, such as, for example, a radial collar of a rotor hub, opposite a stator blade.

The honeycomb element and the base body are usually produced separately from each other and are subsequently connected to each other by high-temperature soldering in a vacuum. The base body is often a solid body which is produced preferably from a high temperature resistant nickel alloy. The honeycomb element usually consists of a plurality of reshaped metal plates that are interconnected to form honeycombs. The separate production of the honeycomb element and of the base body simplifies their formation; however, during the soldering process a distortion of the honeycombs can occur, so that their diameter has to be machine finished, for example, by regrinding. The regrinding is particularly expensive if the base body is an integral body section, such as, an outer shrouding band of a stator blade or a rotor blade, since the clamping and handling of the stator blade is complicated. In addition, the replacement of individual sealing segments is expensive due to the material lock connection. If the base body is mounted on a supporting section, this usually occurs via a sliding engagement in the peripheral direction, as a result of which, when one of the sealing segments is replaced, several sealing segments have to be disassembled from the supporting sections. The metal plate reshaping in addition limits the freedom of design of the sealing segments and that of the sealing arrangement, and as a result construction related compromises have to be made. Moreover, the construction related compromises have a disadvantageous effect on their sealing effect and on the weight of the sealing segments. In addition, the construction of the sealing segments is determined by the connection of the honeycomb element to the base body.

From the German Patent DE 10 259 963 B4, a honeycomb seal is known, whose sealing segments are produced in a single piece by powder metallurgical injection molding. This method allows a flexible freedom of design to the greatest extent possible but the injection molding requires a relatively high expenditure for technical equipment.

A need therefore exists, for a sealing arrangement that eliminates the above-mentioned disadvantages and is easy to assemble and disassemble. Moreover, a need also exists for a method for the simplified production of a sealing segment as well as an efficient turbomachine.

SUMMARY AND DESCRIPTION

The aforementioned needs are addressed by a sealing arrangement as described and claimed herein, by a method as described and claimed herein, as well as by a turbomachine as described and claimed herein.

The sealing arrangement according to the invention for a turbomachine for sealing a radial gap between a rotor and a stator has a plurality of sealing segments each comprising a honeycomb element and a base body for holding the honeycomb element. According to the invention, the base bodies comprise rear, plastically deformable, securing elements. In addition, according to the invention, at least one support is provided to connect the base body to a rotor section or a stator section, which comprises holding fixtures for holding the securing elements.

The solution according to the invention allows a simple installation and removal of the sealing arrangement, since the sealing segments can be attached rapidly to the at least one support, by plastic deformation of the securing elements. Each sealing segment can be attached separately in position, wherein, during the removal of an adjacent sealing segment, its position is not changed. This makes it possible to dispense with the known sliding engagement, for example, as a result of which the sealing segments can be removed individually. A removal of the sealing segments that are adjacent in the peripheral direction is not necessary. Because the securing elements are arranged on the rear of the base body, damage to the honeycomb element during the installation or removal of the sealing segments is prevented. Because the sealing segments are produced separately from the at least one support, they can be connected to the support in the final processed state.

The installation of the sealing arrangement is particularly simple, if the deformable securing elements are configured as pin-like elements, such as rivets, extending in the radial direction of the sealing arrangement, and permitting a positive-locking and friction-locking connection of the base body or of the sealing segments to the at least one support. To simplify the plastic deformation and reduce the weight, it is advantageous if the rivets are hollow rivets.

The installation can be simplified further, if the base bodies and/or the at least one support comprise(s) dimensionally stable securing elements. The dimensionally stable securing elements permit a positive connection and they require no deformation steps. They are particularly advantageous if they replace several of the deformable securing elements, because this results in fewer securing elements having to be deformed. For example, the dimensionally stable securing elements are hook sections that are formed laterally on the base bodies or the at least one support, and that grip, in the installed state of the sealing elements, laterally around the at least one support or the base bodies.

To improve the sealing effect between sealing segments that are adjacent in the peripheral direction, the base bodies can form, on their lateral joint areas, in each case a lap joint.

In order to prevent damage to the honeycomb elements in the joint areas, the honeycomb walls can have a greater wall thickness than in intermediate areas. For example, the wall thicknesses in the joint areas are doubled in comparison with the wall thicknesses in the intermediate areas.

To reduce noise in the interior of the turbomachine, it is advantageous if the honeycomb elements comprise hollow spaces. A high level of sound absorption can be achieved particularly if said hollow spaces open in the direction of the base bodies.

In an embodiment example, the support comprises a front ring, viewed in the direction of flow, and a rear ring, each having a web for mounting on both sides to the rotor section or the stator section, and each having a flange for the formation of the holding fixtures and/or of the dimensionally stable securing elements. The support permits compensation for component and installation tolerances. In addition, this embodiment example makes it possible to compensate for various heat expansions of the sealing segments and of the rotor section or of the stator section.

To prevent thermal stresses within the sealing arrangement, and between the rotor section and the stator section, the support can be mounted by means of a sliding seat on the rotor section or the stator section.

In an alternative embodiment example, each outer shrouding band of a blade is a support. Depending on the type of blade, rotor blade or stator blade, this blade represents the rotor section or the stator section. Consequently, an individual attachment of the support to the rotor section or the stator section is dispensed with.

In order to prevent flow turbulence in the flow channel, particularly in the alternative embodiment example, the supports or outer shrouding bands, on a cladding delimiting the flow channel (i.e., on a flow channel bounding wall), can comprise, in the area of the holding fixtures, recesses in order to level the securing element sections protruding through the supports or shrouding bands.

It is preferable that the honeycomb elements are formed generatively with the base body. As a result, the sealing segments can be designed nearly freely, and subsequent joining work, such as the soldering of the honeycomb elements to the base bodies, is dispensed with, which makes it possible, in particular, to avoid component distortion, and a reworking is dispensed with. The securing elements are preferably also produced generatively with the base body; however, they can also be connected by a material-locking (i.e., cohesive) connection to the base body, after the production.

In a preferred method for producing a sealing segment according to the invention for a sealing arrangement, each comprising a honeycomb element, a base body, and securing elements for securing to a support, the base body, the honeycomb element, and the attachment elements are produced generatively.

The generative production allows an optimal, because nearly free, design of the sealing segments and particularly of the honeycomb elements with regard to the running-in behavior, the sealing effect, the wall thicknesses or wall thickness distribution, the wall porosity, the hollow spaces for sound absorption, and the like. For example, elongate honeycombs, honeycombs having the same wall thickness on all sides, round columns and the like can be formed. Thus, the sealing segment can be optimized in terms of function and structure, which results not only in an optimized sealing effect and noise emission, but also in a lower weight. A soldering process for securing the honeycomb elements to the base bodies is not necessary, so that the sealing segment can be tailor-made without subsequent grinding procedures. Because the securing elements are integral components of the sealing segments, they do not have to be first mounted or introduced during the installation, which further simplifies the installation of the sealing arrangement.

A preferred turbomachine has at least one sealing arrangement according to the invention. Such a turbomachine is characterized by an improved sealing effect and thus by a high level of efficiency. In addition, noise in the interior of the turbomachine is reduced, due to the improved sound absorption.

Other advantageous embodiment examples of the invention are the subject matter of additional dependent claims.

DESCRIPTION OF THE FIGURES

Preferred embodiment examples of the invention are explained in greater detail below, in reference to diagrammatic representations.

DETAILED DESCRIPTION

Figure 1:
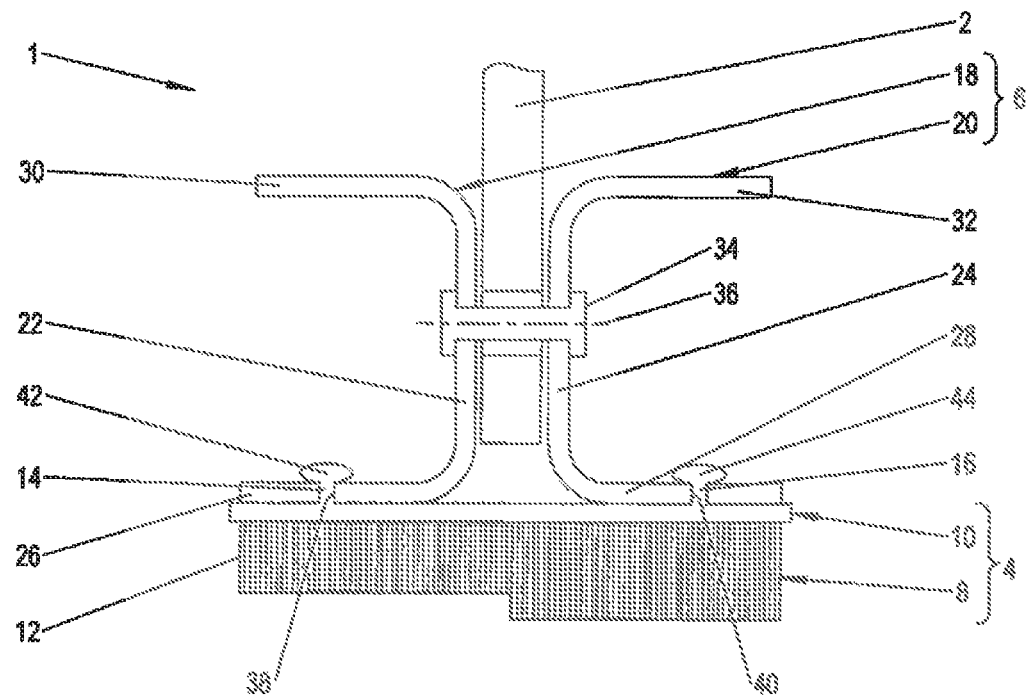
FIG. 1 shows an axial section through a first embodiment of a sealing arrangement according to the invention.

In FIG. 1, a cross section is shown, in the direction of flow, through a first embodiment example of a sealing arrangement 1 according to the invention for a turbomachine for sealing a radial gap between a rotor and a stator. In this embodiment example, the sealing arrangement 1 is connected to a stator section 2 and comprises a plurality of sealing segments 4 as well as a support 6. The stator section 2 can in principle be a housing section, a section of a stator blade, a section of a blade support and the like. For example, the sealing arrangement 1 is arranged in the area of a low-pressure turbine of an airplane engine.

The sealing segments 4 are arranged in each case next to each other in the peripheral direction on the support 6, and they form a closed or nearly closed sealing segment ring which surrounds a rotor hub. They each have a honeycomb element 8 and a base body 10.

The honeycomb element 8 comprises a plurality of honeycombs which are separated from each other by means of individual walls 12. The honeycombs and the walls 12 each have a cross section and a radial height or a length which depend on general conditions, such as, the running-in properties, the sealing effect and the installation position. In particular, the honeycombs and walls 12 can also have different cross sections and, as shown in FIG. 1, different heights in sections. The walls 12 in addition have an individually set porosity.

To prevent damage to the honeycomb elements 8 due to lateral contacts with the respective adjacent honeycomb element, in their lateral joint areas, the walls 12 preferably have a reinforced wall thickness in comparison with the walls 12 which are positioned in the intermediate area between the joint areas. However, due to the axial cross section, the joint areas are not visible.

For sound absorption in the interior of the turbomachine, hollow spaces, not shown, are formed between the honeycombs, which increase in size, for example, in the direction of the base body 10.

The base body 10 is used in each case for holding a honeycomb element 8. It is configured to be plate-like and it closes the honeycombs on one side. Thus, the base body 10 is configured to be a nearly continuous bottom plate of the honeycomb element 8. On the rear it has deformable securing elements 14, 16 which are designed integrally with the base body 10 and particularly generatively. Advantageously, the deformable securing elements 14, 16 are pin-like elements, such as rivets and particularly hollow rivets, extending in a radial direction.

To improve the sealing effect in the lateral joint areas, adjacent base bodies 10 form a lap joint. For this purpose, the base bodies 10 each have a lateral section that is offset in a radial direction with respect to the respective adjacent base body.

The support 6 comprises a front ring 18, viewed in the direction of flow, and a rear ring 20. The rings 18, 20 grip around the rotor hub and they are segmented to simplify the installation. In particular, the rings 18, 20 are U-shaped metal plate profiles which each comprising a web 22, 24, an inner flange 26, 28, and an outer flange 30, 32.

The webs 22, 24 are used for connecting the rings 18, 20 to the stator section 2 and for this purpose they have a radial course corresponding to the stator section 2. To compensate for different heat expansions of the stator section 2 and of the rings 18, 20, the latter are connected by means of a sliding seat to the stator section 2. To form the sliding seat, in each case a mounting element, such as an axial bolt 34, is provided at regular intervals in the peripheral direction, bolt which is guided through a bore 36 which extends in alignment through the webs 22, 24 and the stator section 2.

The inner flanges 26, 28 are used for connecting the sealing segments 4. They extend in the axial direction and they each comprise integral holding fixtures 38, 40 making it possible to pass the deformable securing elements 14, 16 through. In the embodiment example shown, the holding fixtures 38, 40 are through-holes designed complementarily to the rivets 14, 16.

The outer flanges 30, 32 are used to stabilize the rings 18, 20. They extend parallel to the inner flanges 26, 28 and are thus oriented in the axial direction.

At the time of the installation, the securing elements 14, 16 are guided in a radial direction through the holding fixtures 38, 40, and are then reshaped in the head area 42, 44 by means of a riveting process. As a result of the riveting process, the sealing segments 4 are attached with friction-locking and positive-locking connection to the support 6.

During the disassembly, the rivet or pin heads 42, 44 are removed, and the sealing segments 4 can be removed individually in a radial direction from the support 6.

Figure 2:
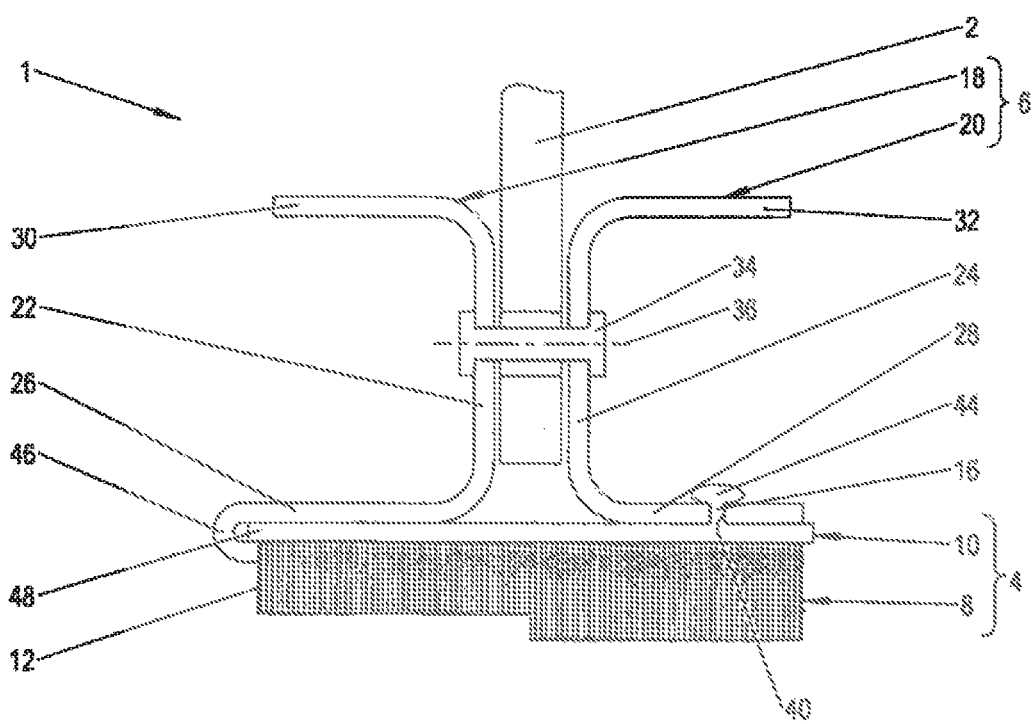
FIG. 2 shows an axial cross section through a second embodiment example of the sealing arrangement according to the invention.

In FIG. 2, an alternative embodiment of the sealing arrangement 1 according to the invention is shown. In contrast to the first embodiment example according to FIG. 1, this embodiment example comprises dimensionally stable securing elements 46, as a replacement for several of the deformable securing elements 14, 16. In the embodiment example shown, the dimensionally stable securing elements 46 are hook segments which extend laterally on one of the inner flanges 26, 28 and which grip around a honeycomb-free marginal section 48 of the respective base body 10. It is preferable for the dimensionally stable securing elements 46 to be arranged upstream of the deformable securing elements 14, 16, and thus in the area of the front ring 18, on the higher-pressure side of the stator section 2.

In the method according to the invention for producing the sealing segments 4, the base body 10, the honeycomb elements 8 as well as the securing elements 14, 16, 46 are produced integrally and in particular generatively as one component. In the process, the shape and the wall thickness or wall thickness distribution, the wall porosity as well as the design of the hollow spaces are adapted individually to the different general conditions, such as, the running-in properties, sealing effect, noise reduction and the like. Selective laser melting or laser sintering is a preferred generative method.

Thus, a sealing arrangement for a turbomachine for sealing a radial gap between a rotor and a stator, with a plurality of sealing segments which each comprising a honeycomb element and a base body for holding the honeycomb element, and with at least one support for the arrangement of the sealing segments on a rotor section or stator section, wherein the base bodies can be arranged on the at least one support by a radial movement or by a plastic deformation of at least one body section, a generative method for the integral production of the sealing segments, and a turbomachine are disclosed.

LIST OF REFERENCE NUMERALS

1 Sealing arrangement
2 Stator section
4 Sealing segment
6 Support
8 Honeycomb element
10 Base body
12 Wall
14 Deformable securing element
16 Deformable securing element
18 Front ring
20 Rear ring
22 Web
24 Web
26 Inner flange
28 Inner flange
30 Outer flange
32 Outer flange
34 Axial bolt
36 Bore
38 Holding fixture
40 Holding fixture
42 Head area/rivet head
44 Head area/rivet head
48 Dimensionally stable securing element
48 Marginal section

What is claimed is:

1. A sealing arrangement for a turbomachine for sealing a radial gap between a rotor and a stator of the turbomachine, the sealing arrangement comprising:
   a plurality of sealing segments disposed adjacent to one another in a peripheral direction so as to form a substantially closed sealing segment ring, each sealing segment including
      a honeycomb element including a plurality of honeycombs separated from each other by walls, and
      a base body configured to be a nearly continuous bottom plate of the honeycomb element extending plate-like in the axial direction, the base body having a front side and a rear side,
         the front side being connected to the honeycomb element, and
         the rear side defining a pin-like element being an integral extension of the rear side of the base body and extending in a radial direction from the plate-like base body; and
   at least one support for connecting the base body to one of a rotor section or a stator section of a turbomachine, the support including a first support portion extending in an axial direction and defining at least one through-hole having a bore oriented in the radial direction extending from a front support side facing the base body to a rear support side, the first support portion being configured on the front support side to abut the plate-like rear side of the base body such that
 a lower portion of the pin-like element extends radially from the rear side of the base body into the bore of the through-hole past the front support side and
 a head portion of the pin-like element is connected to the lower portion and extends radially out from the bore of the through-hole past the rear support side; and wherein plastic deformation of the head portion of the pin-like element when the pin-like element extends radially through the through-hole of the first support portion attaches the sealing segments to the support with a positive-locking connection.

2. A sealing arrangement in accordance with claim 1, further comprising:
 a hook section disposed on the first support portion of the at least one support; and
 wherein the hook section is configured to grip around an axial edge of the base body such that the axial edge is prevented from radial movement when the base body abuts the first support section and the pin-like element extends radially through the through-hole.

3. A sealing arrangement in accordance with claim 1, wherein the honeycomb walls in an area adjacent each lateral joint area between adjacent sealing segments have a greater wall thickness than in intermediate areas.

4. A sealing arrangement in accordance with claim 1, wherein the honeycomb elements comprise hollow spaces configured for sound absorption.

5. A sealing arrangement in accordance with claim 1, wherein the at least one support further comprises:
 a front ring including a front web and a front flange; and
 a rear ring including a rear web attached to the first support portion;
 each of the front web and the rear web is adapted for mounting on a respective side of the rotor section or stator section; and
 each of the front flange and the first support portion includes a through hole.

6. A sealing arrangement in accordance with claim 5, wherein the support can be mounted by means of a sliding seat on the rotor section or stator section.

7. A sealing arrangement in accordance with claim 1, wherein the support is a shrouding band of a blade.

8. A sealing arrangement in accordance with claim 1, wherein the honeycomb elements are formed generatively with the base bodies.

9. A method for producing a sealing segment for a sealing arrangement for a turbomachine for sealing a radial gap between a rotor and a stator of the turbomachine, the sealing arrangement comprising a plurality of sealing segments, each sealing segment including a honeycomb element and a base body connected to the honeycomb element, and at least one support for connecting the base body to one of a rotor section or a stator section of the turbomachine, the support having at least one through-hole having a predetermined radially-oriented configuration, the method comprising the following steps:
 forming generatively a base body configured to be a nearly continuous plate having a front side and a rear side;
 forming generatively a honeycomb element including a plurality of honeycombs separated from each other by walls, the honeycomb element being connected to the front side of the base body; and
 forming generatively a pin-like element extending radially from the rear side of the base body, the pin-like element being plastically deformable, and
 configuring the pin-like element extending radially from the rear side of the base body to be received in the through-hole having a predetermined radially-oriented configuration by a radial motion prior to plastic deformation and to be connected to the holding fixture after plastic deformation.

10. A method for producing a sealing segment in accordance with claim 9, wherein the base body, honeycomb element and pin-like element are produced integrally and generatively as one component.

11. A method for producing a sealing segment in accordance with claim 9, wherein the base body, honeycomb element and pin-like element are each produced using, as the generative process, one of selective laser melting and laser sintering.

12. A turbomachine comprising:
 a rotor;
 a stator; and
 a sealing arrangement for sealing a radial gap between the rotor and the stator, the sealing arrangement including
 a plurality of sealing segments disposed adjacent to one another in a peripheral direction so as to form a substantially closed sealing segment ring, each sealing segment including
  a honeycomb element including a plurality of honeycombs separated from each other, and
  a base body configured to be a nearly continuous bottom plate of the honeycomb element extending plate-like in the axial direction, the base body having a front side and a rear side,
   the front side being connected to the honeycomb element, and
   the rear side defining a pin-like element being an integral extension of the rear side of the base body and extending in a radial direction from the plate-like base body; and
 at least one support for connecting the base body to one of a section of the rotor or a section of the stator, the support including a first support portion extending in an axial direction and defining at least one through-hole having a bore oriented in the radial direction extending from a front support side facing the base body to a rear support side,
 the first support portion being configured on the front support side to abut the plate-like rear side of the base body such that
  a lower portion of the pin-like element extends radially from the rear side of the base body into the bore of the through-hole past the front support side and
  a head portion of the pin-like element is connected to the lower portion and extends radially out from the bore of the through-hole past the rear support side; and
 wherein plastic deformation of the head portion of the pin-like element when the pin-like element extends radially through the through-hole of the first support portion attaches the sealing segments to the support with a positive-locking connection.

* * * * *